(No Model.)
F. GALLEY.
SOFT TREAD HORSESHOE.
No. 587,722. Patented Aug. 10, 1897.
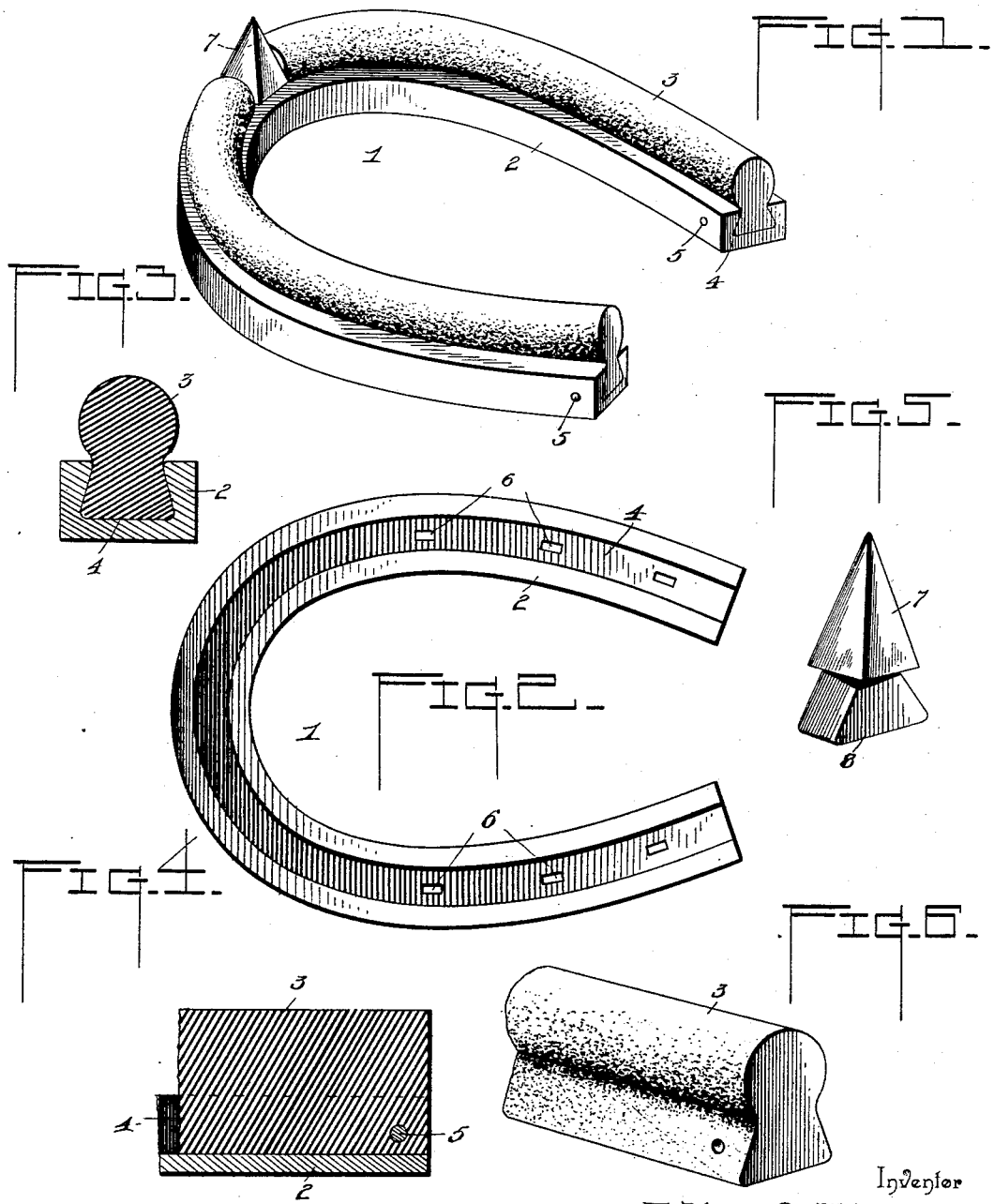
Witnesses
By his Attorneys,
Inventor
Felix Galley.

UNITED STATES PATENT OFFICE.

FELIX GALLEY, OF NASHVILLE, TENNESSEE, ASSIGNOR OF ONE-FOURTH TO ALBERT TAVEL, OF SAME PLACE.

SOFT-TREAD HORSESHOE.

SPECIFICATION forming part of Letters Patent No. 587,722, dated August 10, 1897.

Application filed January 14, 1897. Serial No. 619,212. (No model.)

*To all whom it may concern:*

Be it known that I, FELIX GALLEY, a citizen of the United States, residing at Nashville, in the county of Davidson and State of Tennessee, have invented a new and useful Horseshoe, of which the following is a specification.

The invention relates to improvements in horseshoes.

The object of the present invention is to improve the construction of horseshoes and to provide one which will be practically indestructible, so far as its attachment to a hoof is concerned, and which will have to be removed therefrom only when a hoof needs trimming.

A further object of the invention is to provide a horseshoe which will afford an animal a firm foothold, to prevent stumbling or slipping, and which will serve as a cushion to relieve an animal of jars incident to traveling over a hard or rough road.

The invention consists in the construction and novel combination of parts hereinafter fully described, illustrated in the accompanying drawings, and pointed out in the claim hereto appended.

In the drawings, Figure 1 is a perspective view of a horseshoe constructed in accordance with this invention. Fig. 2 is a plan view of the body of the shoe, the elastic strips which form the tread being removed. Fig. 3 is a transverse sectional view of one side of the horseshoe. Fig. 4 is a detail sectional view illustrating the manner of securing the elastic strip in the groove of the body. Fig. 5 is a detail perspective view of the toe-calk. Fig. 6 is a detail perspective view of a portion of the elastic strip.

Like numerals of reference designate corresponding parts in the several figures of the drawings.

1 designates a horseshoe comprising a body 2 and an elastic tread 3, which is constructed of rubber or other suitable elastic material and which is designed to afford an animal a firm foothold to prevent it from slipping or stumbling, and also to cushion it and relieve it of the jars and strains usually incident to an animal traveling over a rough or hard roadway.

The body 2, which is of the configuration of an ordinary horseshoe, is provided in its lower or outer face with a longitudinal groove or channel 4, having inclined side walls converging outwardly or downwardly to provide a dovetailed way for the reception of the elastic strip 3, and the latter is beveled at opposite sides to fit the way and is introduced into the same by inserting it endwise at the ends of the body. The tread 3 is retained in the groove or channel 4, which is continuous, by transverse fastening devices 5, arranged horizontally and located at the ends of the body. These fastening devices, which may be of any suitable construction, are designed to be readily removable in order that the elastic tread may be readily replaced by a new strip when it becomes worn.

The body of the horseshoe is provided in the groove or channel with nail-holes 6, designed for the reception of the ordinary horseshoe-nails, and so far as the attachment of the shoe to a hoof is concerned the former is practically indestructible—*i. e.*, it need only be removed when the hoof requires trimming. This avoids frequent and excessive puncturing of the hoof and prevents the same from being split by the nails.

The elastic strip 3 is preferably constructed of two pieces or sections which are separated at their front terminals to provide a space for a tapering toe-calk 7, which has a tapering or oppositely-beveled shank 8 to conform to the configuration of the channel or groove 4. The front ends of the elastic sections or strips abut against the toe-calk and prevent the same from shifting laterally of the shoe.

It will be seen that the horseshoe is simple and comparatively inexpensive in construction, that the elastic strips, which are exceedingly cheap, may be readily replaced when worn, and that the shoe will remain on a hoof and need not be removed therefrom until the same requires trimming.

It will also be apparent that the shoe will cushion an animal and afford a secure foothold and prevent slipping or stumbling.

What I claim is—

A horseshoe comprising a body provided with a continuous dovetailed groove or channel, a toe-calk provided with a shank arranged within the groove or channel and conforming to the configuration thereof, and an elastic tread composed of two sections or strips arranged within the groove or channel, located at opposite sides of the toe-calk, and retaining the same in position, substantially as described.

In testimony that I claim the foregoing as my own I have hereto affixed my signature in the presence of two witnesses.

FELIX GALLEY.

Witnesses:
HENRY O. EWING,
EARLEY W. ADAMS.